(12) United States Patent
Lynch et al.

(10) Patent No.: US 6,433,110 B1
(45) Date of Patent: Aug. 13, 2002

(54) PROCESS FOR PRODUCING ALKENE POLYMERS BY GAS PHASE POLYMERISATION

(75) Inventors: John Lynch, Monsheim; David Fischer, Gönnheim; Hans-Helmut Görtz, Freinsheim; Günther Schweier, Friedelsheim, all of (DE)

(73) Assignee: Basell Polyolefine GmbH, Ludwigshafen (DE)

( * ) Notice: Subject to any disclaimer, the term of this patent is extended or adjusted under 35 U.S.C. 154(b) by 0 days.

(21) Appl. No.: 09/125,317

(22) PCT Filed: Feb. 19, 1997

(86) PCT No.: PCT/EP97/00772

§ 371 (c)(1),
(2), (4) Date: Dec. 4, 1998

(87) PCT Pub. No.: WO97/31039

PCT Pub. Date: Aug. 28, 1997

(30) Foreign Application Priority Data

Feb. 20, 1996 (DE) .......................... 196 06 165

(51) Int. Cl.⁷ .............................. C08F 4/16; C08F 4/44; C08F 210/06; B01J 31/38

(52) U.S. Cl. ...................... 526/129; 526/153; 526/154; 526/160; 526/901; 526/943; 526/348.6; 526/351; 526/352; 502/104; 502/117; 502/152

(58) Field of Search ................................. 526/943, 160, 526/901, 154, 153, 129; 502/110, 113, 114, 115, 117, 132, 239, 104, 152

(56) References Cited

U.S. PATENT DOCUMENTS 5,422,325 A * 6/1995 Jejelowo et al. ............. 502/104
5,959,046 A * 9/1999 Imuta et al. ................. 526/127

FOREIGN PATENT DOCUMENTS

| EP | 0 500 944 A1 | * 9/1992 |
| EP | 589 638 | 3/1994 |
| EP | 613 908 | 9/1994 |
| EP | 0 628 574 A1 | * 12/1994 |
| EP | 628 574 | 12/1994 |
| WO | 91/09882 | 7/1991 |
| WO | 94/03506 | 2/1994 |
| WO | 95/14044 | 5/1995 |
| WO | WO 95/15815 | * 6/1995 |
| WO | 96/34020 | 10/1996 |

OTHER PUBLICATIONS

Jr. Org. Chem., 369 (1989) 359–370, Wiesenfeldt et al.

* cited by examiner

Primary Examiner—David W. Wu
Assistant Examiner—R. Harlan
(74) Attorney, Agent, or Firm—Keil & Weinkauf

(57) ABSTRACT

Polymerizable alkanes are prepared by gas-phase polymerization in the presence of catalyst systems by a process in which the catalyst systems used are supported castalyst systems.

11 Claims, No Drawings

PROCESS FOR PRODUCING ALKENE POLYMERS BY GAS PHASE POLYMERISATION

The present invention relates to processes for the preparation of polymers of alkenes by gas-phase polymerization in the presence of catalyst systems.

The present invention furthermore relates to the resulting polymers of alkenes, the use of these polymers for the production of fibers, films and moldings, and the fibers, films and moldings obtainable therefrom.

A process for the preparation of polymers of ethylene by gas-phase polymerization is described, for example, in WO 95/07942. Here, however, a dialkylmetallocene which forms the active catalyst is used.

WO 91/09882 discloses the preparation of a supported, cationic metallocene catalyst by applying the reaction mixture of a dialkylmetallocene with an ionic compound, which has a Brönsted acid as cation and an uncoordinating opposite ion, such as tetrakis(pentafluorophenyl)borate, as the anion, to an inorganic carrier. Here too, an active catalyst is obtained.

Similar supportive catalyst systems are also disclosed in WO 94/03506 and WO 95/14044.

EP-A 628 574 describes supported catalyst systems in which a metallocene dihalide is reacted with an alkylaluminum in the presence of a hydridoborate, and this solution which is active with respect to polymerization is applied to a carrier.

Such catalysts which are already active readily give rise to problems in the metering of the catalyst into the reactor.

What is therefore advantageous is a catalyst which is still inactive and cannot be activated until a later stage, for example during metering or not until it is present in the reactor.

EP-A 613 908 discloses supported metallocene catalyst systems, some of which are not activated until they are present in the reactor. Here, however, the polymers formed have a broad molecular weight distribution $M_w/M_n$.

WO 95/15815 describes catalysts which are obtained by supporting a metallocene dichloride and a borate on a crosslinked polymer as a carrier. The use of deactivated inorganic carriers gives catalysts which, after activation in the polymerization reactor, have either only slight activity or no activity at all.

It is an object of the present invention to provide a process for the preparation of polymers of alkenes by gas-phase polymerization, which process does not have the stated disadvantages and in which in particular the catalyst system can be activated at any desired time, can be stored for a long time and is not pyrophoric and polymers formed have a narrow weight distribution.

We have found that this object is achieved by the process for the preparation of polymers of alkenes by gas-phase polymerization in the presence of catalyst systems, wherein the catalyst systems used are supported catalyst systems obtainable by A) reaction of an inorganic carrier with a metal compound of the general formula I

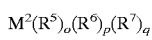   I where
  $M^1$ is an alkali metal, an alkaline earth metal or a metal of main group III or IV of the Periodic Table,
  $R^1$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical,
  $R^2$ to $R^4$ are each hydrogen, halogen, $C_1$–$C_{10}$-alkyl, $C_6$–$C_{15}$-aryl, alkylaryl, arylalkyl, alkoxy or dialkylamino, each having 1 to 10 carbon atoms in the alkyl radical and 6 to 20 carbon atoms in the aryl radical,
  r is an integer from 1 to 4 and
  s, t and u are integers from 0 to 3, the sum r+s+t+u corresponding to the valency of $M^1$, B) reaction of the material obtained according to A) with a metallocene complex in its metal dihalide form and a compound forming metallocenium ions and C) subsequent reaction with a metal compound of the general formula II

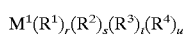   II where
  $M^2$ is a metal of main group III of the Periodic Table,
  $R^5$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical,
  $R^6$ and $R^7$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms from the aryl radical,
  o is an integer from 1 to 3 and
  p and q are integers from 0 to 2, the sum o+p+q corresponding to the valency of $M^2$.

We have furthermore found polymers of alkenes obtainable thereby, their use for the production of fibers, films and moldings, and fibers, films and moldings obtainable therefrom.

The novel process is used for the preparation of polymers of alkenes. The term polymers is understood as meaning both homopolymers and copolymers. Particularly suitable alkenes are alk1-enes, preferably ethylene and propylene, in particular ethylene. Alk1-enes also are particularly suitable as comonomers, preferably straight-chain $C_4$–$C_{10}$-alk1-enes, in particular but1-ene, hex1-ene und oct1-ene. However, it is also possible to use other alkenes, for example cycloolefins or higher alkenes.

Supported catalyst systems which are obtainable by reacting an inorganic carrier with a metal compound of the general formula I in a first stage A) are used in the novel process.

Preferably used carriers are finely divided solids with particle diameters of from 1 to 200 μm, in particular from 30 to 70 μm.

Examples of suitable carriers are silica gels, preferably those of the formula $SiO_2 \cdot a\ Al_2O_3$, where a is from 0 to 2, preferably from 0 to 0.5; these are therefore aluminosilicates or silica. Such products are commercially available, for example Silica Gel 332 from Grace.

Other inorganic compounds, such as $Al_2O_3$ or $MgCl_2$, or mixtures containing these compounds may also be used as carriers.

Preferred metal compounds of the general formula I are those in which $M^1$ is a metal of main group III of the Periodic Table, in particular aluminum, $R^1$ is $C_1$–$C_{10}$-alkyl and $R^2$ to $R^4$ are each $C_1$–$C_{10}$-alkyl. For the particularly preferred case where $M^1$ is aluminum, u is zero and $R^1$ to $R^3$ have in particular the same meaning, preferably methyl, ethyl, isobutyl or hexyl, preferably isobutyl.

Preferably, the metal compound of the general formula I is added as a solution to a suspension of the carrier. Particularly suitable solvents or suspending agents are hydrocarbons, such as heptane. The amount of metal compound I may be varied within wide limits, the minimum amount depending on the number of hydroxyl groups of the carrier. The temperatures, reaction times and pressures are not critical per se, temperatures of from 0 to 80° C. and reaction times of from 0.1 to 48 hours being preferred.

It has proven suitable to remove the excess metal compound I by thorough washing, for example with hydrocarbons, such as pentane or hexane, after the carrier pretreatment and to dry the carrier.

The material thus prepared can be stored for up to 6 months and is not pyrophoric.

This material is then reacted, in a further stage B), with a metallocene complex in its metal dihalide form and the compound forming metallocenium ions.

Examples of suitable metallocene complexes are compounds of the general formula III:

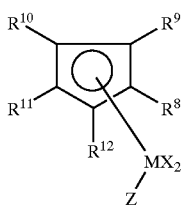

III where
- M is titanium, zirconium, hafnium, vanadium, niobium or tantalum,
- X is fluorine, chlorine, bromine or iodine,
- $R^8$ to $R^{12}$ are each hydrogen, $C_1$–$C_{10}$-alkyl, 5- to 7-membered cycloalkyl which in turn may carry a $C_1$–$C_{10}$-alkyl as a substituent, $C_6$– to $C_{15}$-aryl or alkylaryl, where two adjacent radicals together may form a cyclic group of 4 to 15 carbon atoms, or $Si(R^{13})_3$, or where
- $R^{13}$ is $C_1$–$C_{10}$-alkyl, $C_3$–$C_{10}$-cycloalkyl or $C_6$–$C_{15}$-aryl,
- Z is X or

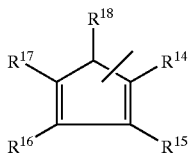

where
- $R^{14}$ to $R^{18}$ are each hydrogen, $C_1$–$C_{10}$-alkyl, 5- to 7-membered cycloalkyl which in turn may carry a $C_1$–$C_{10}$-alkyl as a substituent, $C_6$–$C_{15}$-aryl or arylalkyl, where two adjacent radicals together may form a cyclic group of 4 to 15 carbon atoms, or $Si(R^{19})_3$ where
- $R^{19}$ is $C_1$–$C_{10}$-alkyl, $C_6$–$C_{15}$-aryl or $C_3$–$C_{10}$-cycloalkyl, or where $R^{11}$ and Z together form a group —$R^{20}$—A—, where

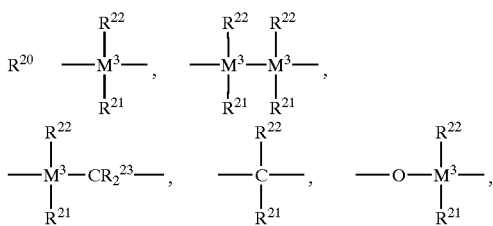

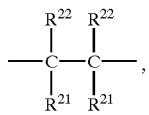

$=BR^{22}$, $=AlR^{22}$, —Ge—, —Sn—, —O—, —S—, $=SO$, $=SO_2$, $=NR^{22}$, $=CO$, $=PR^{22}$ or $=P(O)R^{22}$, where $R^{21}$, $R^{22}$ and $R^{23}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or where two adjacent radicals together with the atoms linking them may form a ring, and $M^3$ is silicon, germanium or tin, A is 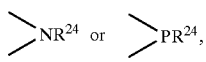

$R^{24}$ $C_1$–$C_{10}$-alkyl, $C_6$–$C_{15}$-aryl, $C_3$–$C_{10}$-cycloalkyl, alkylaryl or $Si(R^{25})_3$, $R^{25}$ is hydrogen, $C_1$–$C_{10}$-alkyl, $C_6$–$C_{15}$-aryl, which in turn may be substituted by $C_1$–$C_4$-alkyl, or $C_3$–$C_{10}$-cycloalkyl or where $R^{11}$ and $R^{17}$ together form a group —$R^{20}$—.

Preferred metallocene complexes of the general formula III are

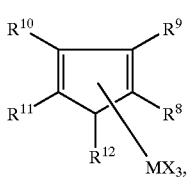

IIIa

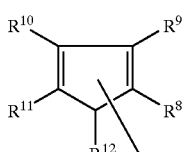

IIIb

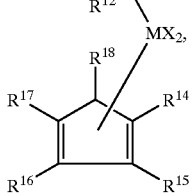

IIIc

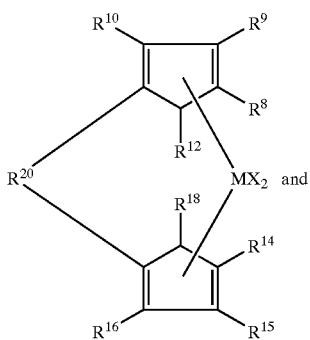

IIId

[Structure showing cyclopentadienyl ring with R⁹, R¹⁰, R⁸, R¹², R²⁰, MX₂, and A substituents]

The radicals X may be identical or different but are preferably identical.

Particularly preferred compounds of the formula IIIa are those in which
  M is titanium, zirconium or hafnium,
  X is chlorine and
  $R^8$ to $R^{12}$ are each hydrogen or $C_1$–$C_4$-alkyl.

Preferred compounds of the formula IIIb are those in which
  M is titanium, zirconium or hafnium,
  X is chlorine,
  $R^8$ to $R^{12}$ are each hydrogen, $C_1$–$C_4$-alkyl or $Si(R^{13})_3$ and
  $R^{14}$ to $R^{18}$ are each hydrogen, $C_1$–$C_4$-alkyl or $Si(R^{19})_3$.

The compounds of the formula IIIb in which the cyclo pentadienyl radicals are identical are particularly suitable.

Examples of particularly suitable compounds include bis(cyclopentadienyl)zirconium dichloride, bis(pentamethylcyclopentadienyl)zirconium dichloride, bis(methylcyclopentadienyl)zirconium dichloride, bis(ethylcyclopentadienyl)zirconium dichloride, bis(n-butylcyclopentadienyl)zirconium dichloride and bis(trimethylsilylcyclopentadienyl)zirconium dichloride.

Particularly suitable compounds of the formula IIIc are those in which
  $R^8$ and $R^{14}$ are identical and are each hydrogen or $C_1$–$C_{10}$-alkyl,
  $R^{12}$ and $R^{18}$ are identical and are each hydrogen, methyl, ethyl, isopropyl or tert-butyl,
  $R^{10}$ and $R^{16}$ are each $C_1$–$C_4$-alkyl,
  $R^9$ and $R^{15}$ are each hydrogen or two adjacent radicals $R^9$ and $R^{10}$ on the one hand and $R^{15}$ and $R^{16}$ on the other hand together form a cyclic group of 4 to 12 carbon atoms, $R^{20}$ is $\;-\underset{R^{21}}{\overset{R^{22}}{M^3}}-\;$ or $\;-\underset{R^{21}}{\overset{R^{22}}{C}}-\underset{R^{21}}{\overset{R^{22}}{C}}-\;$, M is titanium, zirconium or hafnium and
  X is chlorine.

Examples of particularly suitable complex compounds include dimethylsilanediylbis(cyclopentadienyl)zirconium dichloride, dimethylsilanediylbis(indenyl)zirconium dichloride, dimethylsilanediylbis(tetrahydroindenyl) zirconium dichloride, ethylenebis(cyclopentadienyl) zirconium dichloride, ethylenebis(indenyl)zirconium dichloride, ethylenebis(tetrahydroindenyl)zirconium dichloride, tetramethylethylene-9-fluorenylcyclopentadienyl zirconium dichloride, dimethylsilanediylbis(-3-tert-butyl-5-methylcyclopentadienyl)zirconium [sic] dichloride, dimethylsilanediylbis(-3-tert-butyl-5-ethylcyclopentadienyl)zirconium [sic] dichloride, dimethylsilanediylbis(-2-methylindenyl)zirconium [sic] dichloride, dimethylsilanediylbis(-2-isopropylindenyl) zirconium [sic] dichloride, dimethylsilanediylbis(-2-tert-butylindenyl)zirconium [sic] dichloride, diethylsilanediylbis(-2-methylindenyl)zirconium [sic] dibromide, dimethylsilanediylbis(-3-methyl-5-methylcyclopentadienyl) zirconium [sic] dichloride, dimethylsilanediylbis(-3-ethyl-5-isopropylcyclopentadienyl)zirconium [sic] dichloride, dimethylsilanediylbis(-2-methylindenyl)zirconium [sic] dichloride, dimethylsilanediylbis(-2-methylbenzindenyl) zirconium [sic] dichloride and dimethylsilanediylbis(-2-methylindenyl)hafnium [sic] dichloride.

Particularly suitable compounds of the general formula IIIb are those in which
  M is titanium or zirconium,
  X is chlorine, $R^{20}$ is $\;-\underset{R^{21}}{\overset{R^{22}}{M^3}}-\;$ or $\;-\underset{R^{21}}{\overset{R^{22}}{C}}-\underset{R^{21}}{\overset{R^{22}}{C}}-\;$, A is $\;-O-\;,\;\;-S-\;,\;\;\rangle NR^{24}$ and
  $R^8$ to $R^{10}$ and $R^{12}$ are each hydrogen, $C_1$–$C_{10}$-alkyl, $C_3$–$C_{10}$-cycloalkyl, $C_6$–$C_{15}$-aryl or $Si(R^{14})_3$, or where two adjacent radicals form a cyclic group of 4 to 12 carbon atoms.

The synthesis of such complex compounds can be carried out by methods known per se, the reaction of the appropriately substituted, cyclic hydrocarbon anions with halides of titanium, zirconium, hafnium, vanadium, niobium or tantalum being preferred.

Examples of appropriate preparation processes are described, inter alia, in J. Organometal. Chem., 369 (1989), 359–370.

Mixtures of different metallocene complexes may also be used.

Particularly suitable compounds forming metallocenium ions are strong, neutral Lewis acids, ionic compounds having Lewis acid cations and ionic compounds having Brönsted acids as cations.

Preferred strong, neutral Lewis acids are compounds of the general formula IV $$M^4X^1X^2X^3 \hspace{2cm} IV$$

where,
  $M^4$ is an element of main group III of the Periodic Table, in particular B, Al or Ga, preferably B, and
  $X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred are compounds of the general formula IV where $X^1$, $X^2$ and $X^3$ are identical, preferably tris(pentafluorophenyl)borane.

Suitable ionic compounds having Lewis acid cations are compounds of the general formula V $$[(Y^{a+})Q_1Q_2\ldots Q_z]^{d+} \hspace{2cm} V$$

where
- Y is an element of main group I to VI or subgroup I to VIII of the Periodic Table,
- $Q_1$ to $Q_z$ are radicals having a single negative charge, such as $C_1$–$C_{28}$-alkyl, $C_6$–$C_{15}$-aryl, alkylaryl, arylalkyl, haloalkyl, or haloaryl, each having 6 to 20 carbon atoms in the aryl radical and 1 to 28 carbon atoms in the alkyl radical, $C_1$–$C_{10}$-cycloalkyl, which may be substituted by $C_1$–$C_{10}$-alkyl, or halogen, $C_1$–$C_{28}$-alkoxy, $C_6$–$C_{15}$-aryloxy, silyl- or mercaptyl,
- a is an integer from 1 to 6,
- z is an integer from 0 to 5
- d corresponds to the difference a–z, but d is greater than or equal to 1.

Carbonium cations, oxonium cations and sulfonium cations and cationic transition metal complexes are particularly suitable. Particular examples are the triphenylmethylcation, the silver cation and the 1,1'-dimethylferrocenylcation. They preferably have noncoordinating opposite ions, in particular boron compounds, as also stated in WO 91/09882, preferably tetrakis (pentafluorophenyl)borate.

Ionic compounds having Brönsted acids as cations and preferably also noncoordinating opposite ions are mentioned in WO 91/09882, a preferred cation being N,N-dimethylanilinium.

The amount of compounds forming metallocenium ions is preferably from 0.1 to 10 equivalents, based on the metallocene complex III.

The conditions for the reaction of the metallocene complex with the compound forming metallocenium ions are not critical per se; the reaction is preferably carried out in solution, particularly suitable solvents being hydrocarbons, preferably aromatic hydrocarbons, such as toluene.

The material prepared according to A) is then added to this. An amount of from 0.1 to 10% by weight, based on the inorganic carrier, of metallocene complex is particularly suitable. The conditions for this reaction are likewise not critical, temperatures of from 20 to 80° C. and reaction times of from 0.1 to 20 hours having proven particularly suitable.

The material obtained according to B) can then be isolated and can be stored for up to at least 6 months.

In a further stage C), the activation stage, the material obtained according to B) is reacted with a metal compound of the general formula II. This activation can be carried out at any desired time, ie. before, during or after the metering of the material obtained according to B) into the reactor. The activation is preferably carried out after the metering of the material obtained according to B) into the reactor.

Among the metal compounds of the general formula II

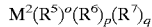

$$M^2(R^5)^o(R^6)_p(R^7)_q \qquad \text{II}$$

where
- $M^2$ is a metal of main group III of the Periodic Table, ie. boron, aluminum, gallium, indium or thallium,
- $R^5$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical,
- $R^6$ and $R^7$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical,
- o is an integer from 1 to 3 and
- p and q are integers from 0 to 2, the sum o+p+q corresponding to the valency of $M^2$,
preferred compounds are those in which
- $M^2$ is aluminum and
- $R^5$ to $R^7$ are each $C_1$–$C_{10}$-alkyl.

Particularly preferred metal compounds of the general formula II are tri-n-hexyl-aluminum and truisobutylaluminum.

The conditions for the reaction in stage C) are not critical per se. Temperatures, reaction times and pressures depend on the time when the reaction, ie. activation, is carried out.

The gas-phase polymerization is known per se. Usually, polyolefin granules, preferably polyethylene or polypropylene granules, are initially taken in an autoclave. Polymerization temperatures are in general from –50 to 300° C., preferably from –20 to 100° C. The internal pressure of the autoclave can be increased to 80, preferably 50, bar by feeding in alkene. After the end of polymerization, the autoclave is usually let down.

In the novel process, there are no problems at all with wallcoatings and the formation of lumps. The catalyst systems used can be activated at any desired time, are air-and moisture-insensitive, can be stored for a long time and are not pyrophoric. In addition, polymers which have an narrow molecular weight distribution and are suitable for the production of fibers, films and moldings are formed.

EXAMPLES

Example 1

Reaction of $SiO_2$ with triisobutylaluminum (Stage A))

100 g of $SiO_2$ (SG 332 from Grace; dried for 12 hours at 200° C.) were suspended in 1 l of dry heptane. At room temperature, 140 ml of a 2 molar solution of triisobutylaluminum in heptane were added dropwise in the course of 30 minutes, the temperature increasing to 35° C. Thereafter, stirring was carried out overnight and the product was filtered off and was washed twice with pentane. Drying was then carried out under reduced pressure from an oil pump until the weight remained constant (carrier 1).

Example 2

Reaction with Metallocene Complex and N, N-dimethylanilinium tetrakis(pentafluorphenyl)borate (Stage B))

0.5 mmol of the respective metallocene complex and in each case 0.5 mmol of N,N-dimethylanilinium tetrakis (pentafluorphenyl)borate were dissolved in 50 ml of absolute toluene at 80° C. In each case, 5 g of the material obtained according to Example 1 were added to this and the dispersion thus obtained was stirred for 30 minutes at 80° C. Thereafter, the solvent was stripped off at 10 mbar and the solid residue was dried under reduced pressure from an oil pump until a free-flowing powder remained.

Metallocene complexes used:
III 1: Bis(n-butylcyclopentadienyl)zirconium dichloride
III 2: Dimethylsilanediylbis(indenyl)zirconium dichloride
III 3: Ethylenebis(indenyl)zirconium dichloride
III 4: Dimethylsilanediyl(N-tert-butylamido)($\eta^5$-2,3,4,5-tetra-methylcyclopentadienyl)titanium dichloride

Examples 3 to 6

Preparation of Polyethylene in the Gas Phase

A 1 l steel autoclave was filled with 80 g of polyethylene granules heated to 70° C. and flushed with argon for 1 hour.

3 ml of a 0.2-molar solution of tri-n-hexylaluminum in heptane were then injected. Thereafter, 50 mg of the material prepared in Example 2 were blown in with ethylene and the ethylene pressure was increase to 40 bar. Polymerization was carried out at 70° C. until 150 g of ethylene had been absorbed and was stopped by letting down the pressure.

Table below provides information about the compounds used and the properties of the polyethylenes.

The limit viscosity η was determined according to ISO 1628/3.

TABLE

| Ex. | Metallocene complex | Productivity [g of polymer/ g of catalyst*] | η [dl/g] |
| --- | --- | --- | --- |
| 3 | III 1 | 1604 | 4.52 |
| 4 | III 2 | 3290 | 2.23 |
| 5 | III 3 | 2256 | 1.54 |
| 6 | III 4 | 1306 | 13.9 |

*Catalyst means the product obtained according to stage B).

We claim:

1. A process for the preparation of polymers of alkenes by gas-phase polymerization in the presence of a catalyst system, wherein the catalyst system used is a supported catalyst system obtained by a process wherein first a solid component of a supported catalyst system is prepared by a process consisting essentially of the reaction of an inorganic support with a metallocene complex and a compound forming metallocenium, ions, wherein A) the support is prepared by reaction of an inorganic carrier with a metal compound of the formula I

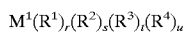

where

M$^1$ is an alkali metal, an alkaline earth metal or a metal of main group III or IV of the Periodic Table, R$^1$ is hydrogen, C$_1$–C$_{10}$-alkyl, C$_6$–C$_{15}$-aryl, alkylaryl or arylalkyl each having 1 to 10 carbon atoms in the alkyl radical and 6 to 20 carbon atoms in the aryl radical, R$^2$ to R$^4$ are each hydrogen, halogen, C$_1$–C$_{10}$-alkyl, C$_6$–C$_{15}$-aryl, alkylaryl or alkoxy, or dialkylamino each having 1 to 10 carbon atoms in the alkyl radical and 6 to 20 carbon atoms in the aryl radical, r is an integer from 1 to 4 and s, t and u are integers from 0 to 3 the sum r+s+t+u corresponding to the valency of M$^1$, and subsequent removal of excess metal compound of the formula I and B) the material obtained according to A) is reacted with a metallocene complex in its metal dihalide form and a compound forming metallocenium ions selected from the group consisting of boron containing strong, neutral Lewis acids, ionic compounds having Lewis acid cations and ionic compounds having Brönsted acids as cations, and subsequently said solid component of the catalyst system is C) reacted with a metal compound of the formula II

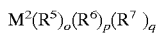

where

M$^2$ is a metal of main group III of the Periodic Table,

R$^5$ is hydrogen, C$_1$–C$_{10}$-alkyl, C$_6$–C$_{15}$-aryl, alkylaryl or arylalkyl each having 1 to 10 carbon atoms in the alkyl radical and 6 to 20 carbon atoms in the aryl radical, R$^6$ and R$^7$ are each hydrogen, halogen, C$_1$–C$_{10}$-alkyl, C$_6$–C$_{15}$-aryl, alkylaryl, arylalkyl or alkoxy, each having 1 to 10 carbon atoms in the alkyl radical and 6 to 20 carbon atoms in the aryl radical, o is an integer from 1 to 3 and p and q are integers from 0 to 2 the sum o+p+q corresponding to the valency of M$^2$.

2. A process as claimed in claim 1, wherein the material obtained according to A) is isolated and dried.

3. A process as claimed in claim 1, wherein the reaction of step A) is carried out at a temperature of from 0° C. to 80° C. and a reaction time of from 0.1 to 48 hours.

4. A process as claimed in claim 1, wherein, in the formula 1, M$^1$ is aluminum, R$^1$ to R$^3$ are each C$_1$–C$_{10}$-alkyl and u is zero.

5. A process as claimed in claim 1, wherein, in the formula II, R$^5$ to R$^7$ are each C$_1$–C$_{10}$-alkyl.

6. A process as claimed in claim 1, wherein, the reaction of the solid component of the catalyst system with the metal compound of the formula II takes place in a polymerization reactor.

7. The process of claim 1, wherein said olefin polymers are homopolymers or copolymers of ethylene or propylene.

8. A polymer of alkenes, obtained by a process as claimed in claim 1.

9. A fiber, film or molding containing a polymer of alkenes as claimed in claim 1 as an essential component.

10. A homopolymer or copolymer of ethylene or propylene obtained from the process of claim 7.

11. A process as claimed in claim 1, wherein said inorganic carrier is dried prior to reaction with the metal compound of formula I.

* * * * *